US009967185B1

(12) United States Patent
Ramamoorthi et al.

(10) Patent No.: US 9,967,185 B1
(45) Date of Patent: *May 8, 2018

(54) INTERFACE FOR EXTENDING SERVICE CAPABILITIES OF A NETWORK DEVICE

(71) Applicant: Juniper Networks, Inc., Sunnyvale, CA (US)

(72) Inventors: Sankar Ramamoorthi, San Jose, CA (US); Satyadeva Konduru, San Jose, CA (US); Gregory Kotlyar, San Jose, CA (US); Satish Raghunath, Sunnyvale, CA (US); Sivakumar Venkatesan, Sunnyvale, CA (US); Ramakanth Gunuganti, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 156 days.

This patent is subject to a terminal disclaimer.

(21) Appl. No.: 15/005,726

(22) Filed: Jan. 25, 2016

Related U.S. Application Data

(63) Continuation of application No. 14/134,740, filed on Dec. 19, 2013, now Pat. No. 9,246,800, which is a continuation of application No. 12/765,636, filed on Apr. 22, 2010, now Pat. No. 8,615,009.

(60) Provisional application No. 61/298,088, filed on Jan. 25, 2010.

(51) Int. Cl.
*H04L 12/28* (2006.01)
*H04L 12/741* (2013.01)

(52) U.S. Cl.
CPC .................................. *H04L 45/74* (2013.01)

(58) Field of Classification Search
CPC ......... H04L 45/74; H04L 45/60; H04L 45/64; H04L 45/22; H04L 45/106; H04L 45/741
See application file for complete search history.

(56) References Cited

U.S. PATENT DOCUMENTS

| 7,225,270 B2 | 5/2007 | Barr et al. |
| 7,688,829 B2 | 3/2010 | Guichard et al. |
| 8,615,009 B1 | 12/2013 | Ramamoorthi et al. |

(Continued)

OTHER PUBLICATIONS

Simpson, "IP in IP Tunneling," RFC 1853, Network Working Group, Oct. 1995, 7 pp.

(Continued)

*Primary Examiner* — Ian N Moore
*Assistant Examiner* — Ronald H Davis
(74) *Attorney, Agent, or Firm* — Shumaker & Sieffert, P.A.

(57) ABSTRACT

An example network device includes a network interface and a control unit that receives a packet having header information. The control unit includes a forwarding structure having a plurality of entries that each refers to one of a plurality of logical interfaces, a forwarding engine configured to access the forwarding structure to select a first logical interface to which to forward the packet based on the header information, wherein the first logical interface comprises a pseudo-device interface (PDI). The control unit also includes a PDI module that tunnels the packet to an external service complex (ESC) by at least applying a set of metadata to the packet, encapsulating the packet with a header, and forwarding the packet to the ESC via the network interface, and wherein the metadata allows the ESC to determine a set of services to be applied to the packet based on the metadata.

16 Claims, 6 Drawing Sheets

(56) References Cited

U.S. PATENT DOCUMENTS

2007/0110048 A1   5/2007   Voit et al.
2007/0237147 A1   10/2007  Quinn et al.
2008/0177896 A1   7/2008   Quinn et al.
2010/0063988 A1   3/2010   Khalid et al.
2010/0165985 A1   7/2010   Sharma et al.
2010/0316056 A1   12/2010  Unbehagen et al.
2011/0019552 A1   1/2011   Karaoguz et al.
2011/0023090 A1   1/2011   Asati et al.

OTHER PUBLICATIONS

Perkins, "IP Encapsulation within IP," RFC 2003, Network Working Group, Oct. 1996, 12 pp.
J. Case, et al., "A Simple Network Management Protocol (SNMP)", RFC 1157, May 1990.
Case et al. "A Simple Network Management Protocol (SNMP)", RFC 1098, Network Working Group, IETF, Apr. 1989, 35 pgs.
Prosecution History of U.S. Appl. No. 12/765,636 dated Mar. 14, 2012 to Sep. 16, 2013, 105 pgs.
U.S. Appl. No. 14/134,740, filed Dec. 19, 2013 "Interface for Extending Service Capabilities of a Network Device".
Prosecution History of U.S. Appl. No. 14/134,740 dated Mar. 31, 2015 to Oct. 5, 2015, 53 pgs.

| FORWARDING TABLE | | | |
|---|---|---|---|
| INPUT INTERFACE (102) | SOURCE (104) | DESTINATION (106) | OUTPUT INTERFACE (108) |
| gi-1/3/0.0 | 10.1.1.1 | 11.2.1.1 | pdo-1/7/0.0 |
| pdi-1/7/0.0 | 10.1.1.1 | 11.2.1.1 | so-1/2/0.1 |
| si-2/2/0.1 | 10.1.1.1 | 11.2.1.1 | pdo-3/2/0.0 |
| pdi-3/2/0.0 | 10.1.1.1 | 11.2.1.1 | go-1/2/0.0 |
| ⋮ | ⋮ | ⋮ | ⋮ |

FIG. 4

INTERFACE FOR EXTENDING SERVICE CAPABILITIES OF A NETWORK DEVICE

This application is a continuation of U.S. application Ser. No. 14/134,740, filed Dec. 19, 2013, which is a continuation of U.S. application Ser. No. 12/765,636, filed Apr. 22, 2010, now issued U.S. Pat. No. 8,615,009, which claims the benefit of U.S. Provisional Application No. 61/298,088, filed Jan. 25, 2010, the entire content of each of which is incorporated herein by reference.

TECHNICAL FIELD

This disclosure relates to computer networks and, more particularly, to processing network packets within computer networks.

BACKGROUND

A computer network is a collection of interconnected computing devices that exchange data and share resources. In a packet-based network, such as the Internet, the computing devices communicate data by dividing the data into small blocks called packets. The packets are individually routed across the network from a source device to a destination device. The destination device extracts the data from the packets and assembles the data into its original form. Dividing the data into packets enables the source device to resend only those individual packets that may be lost during transmission.

Certain devices, referred to as routers, maintain routing information that describes routes through the network. A "route" can generally be defined as a path between two locations on the network. Routers include a control plane, sometimes called a management plane, which maintains the routing information, and a forwarding plane, which forwards received packets according to the routing information. The incoming packets may include various types of context information, such as class of service information or post-service firewall operation information.

Network service providers provide services such as security, tunneling, virtual private networks, caching, application proxies, and content delivery network (CDN) services to incoming packets. Service providers also provide content-specific services designed to improve the quality of a user's experience, for example, video streaming. To provide these new services, routers have been modified to include additional hardware or software that applies various services to the incoming packets. For example, line cards installed in a service plane of a router may be configured to perform particular services, such as the services described above.

Conventional approaches to providing such services include building custom hardware blades for a particular router, and clustering multiple routers or servers. Building custom hardware blades can be expensive and time consuming, preventing service providers from quickly deploying hardware that supports new services. Clustering also increases operational costs because it requires many different devices and provides no integration with the router, requiring an administrator to learn about and manage additional devices.

SUMMARY

In general, this disclosure describes techniques for providing an integrated approach to adding service capabilities to network devices. More specifically, this disclosure describes techniques for extending the service capabilities of a network device that provides consistent interfaces to both internal and external service complexes that provide the required service capabilities. In this manner, the network device may seamlessly interface with off-the-shelf service complexes designed to communicate with any network device, custom service complexes built specifically for the network device, or any combination thereof. The techniques of this disclosure also provide a simplified path to utilization of custom hardware where specifically needed. A network device configured according to these techniques maintains a consistent interface between the network device and the underlying service complexes regardless of whether the service complexes comprise off-the-shelf devices or custom hardware.

The techniques of this disclosure include providing a set of forwarding plane logical interfaces that provide a consistent set of operations for the forwarding plane when processing packets that require servicing by a service complex, irrespective of the type, location, or number of services performed by the service complex. The techniques further include providing a pseudo-device interface that applies metadata to each packet and provides an inline tunneling mechanism to send and receive packets to an external service complex. The forwarding plane interfaces and the pseudo-device interface decouple the service complex from the network device while maintaining the advantages of tight coupling through the use of metadata and tunneling from the interfaces to the service complex. Each service complex may include a service card within the network device, an external blade server, an external computer or server containing off-the-shelf components, or a routing engine process. The forwarding plane interfaces provide a consistent interface for any and all of these types of service complexes while maintaining all metadata associated with the packets processed by the network device, thereby simplifying further processing of the packets once the packets have been serviced by the service complex.

In one example, a method includes receiving, with a network device, a packet having header information, and accessing, with a forwarding plane of the network device, a forwarding structure to select a first logical interface to which to forward the packet based on the header information, wherein the first logical interface comprises a pseudo-device interface associated with a service complex external to the network device that applies a set of services to the packet, wherein the first logical interface is mapped to a first physical output interface of the network device, wherein the forwarding structure comprises a plurality of entries that each refer to one of a plurality of logical interfaces, and wherein the first logical interface comprises one of the plurality of logical interfaces. The method also includes tunneling the packet to the external service complex with the pseudo-device interface, wherein tunneling the packet comprises applying a set of metadata to the packet, applying a header to the packet, and forwarding the packet to the external service complex via the first physical output interface, wherein the metadata allows the external service complex to determine the set of services to be applied to the packet based on the metadata.

In another example, a network device includes a plurality of physical network interfaces for sending and receiving network packets and a control unit that receives a packet having header information via the plurality of physical network interfaces. The control unit comprises a forwarding plane. The forwarding plane comprises a forwarding structure having a plurality of entries that each refers to one of a plurality of logical interfaces, a forwarding engine, and a pseudo-device interface module. The forwarding engine is configured to access the forwarding structure to select a first logical interface of the plurality of logical interfaces to which to forward the packet based on the header information, and forward the packet to the first logical interface, wherein the first logical interface comprises a pseudo-device interface instance associated with an external service complex that applies a set of services to the packet, and wherein the first logical interface is mapped to a first one of the plurality of physical network interfaces. The pseudo-device interface module is configured to execute one or more pseudo-device interface instances, wherein the pseudo-device interface instance of the first logical interface tunnels the packet to the external service complex by at least applying a set of metadata to the packet, encapsulating the packet with a header, and forwarding the packet to the external service complex via the first one of the physical network interfaces, and wherein the metadata allows the external service complex to determine a set of services to be applied to the packet based on the metadata.

In another example, a computer-readable storage medium is encoded with instructions for causing one or more programmable processors to access a forwarding structure stored with a network device to selecting a first logical interface to which to forward a packet having header information based on the header information, wherein the first logical interface comprises a pseudo-device interface associated with an external service complex, wherein the external service complex applies a set of services to the packet, wherein the first logical interface is mapped to a first physical output interface, wherein the forwarding structure comprises a plurality of entries that each refer to one of a plurality of logical interfaces, and wherein the first logical interfaces comprises one of the plurality of logical interfaces. The instructions may also include instructions for causing the one or more programmable processors to tunnel the packet to the external service complex with the pseudo-device interface, wherein tunneling the packet comprises applying a set of metadata to the packet, applying a header to the packet, and forwarding the packet to the external service complex via the first physical output interface, wherein the metadata allows the external service complex to determine the set of services to be applied to the packet based on the metadata.

The techniques of this disclosure may provide one or more advantages. For example, the techniques of this disclosure allow for retaining tight coupling of external service complexes with the forwarding plane, which maintains packet context information such as class of service and post-service forwarding plane operations, thereby allowing the forwarding plane to perform additional operations on the packet in a simplified manner that is compatible with other established platforms. As another example, the techniques of this disclosure enable an operator to perform services management for services provided by an external service complex in the same manner as services provided by internal service complexes. Furthermore, the techniques can support a many-to-one mapping from routers to service complexes, allowing a service provider to maximize its investment in service complexes by ensuring the service complexes are operating at near maximum capacity.

The techniques may allow for freedom to rapidly deploy new services onto a router with off-the-shelf hardware without adding to operational expenses or complexity of the router. Further, the techniques allow a natural progression to custom hardware where required, as changes in a hardware provisioning model may have minimal system-level impact with this approach. The techniques of this disclosure are effective in a number of different deployment scenarios, including complex deployment scenarios that implement Virtual Routing and Forwarding (VRF) hopping and/or route-prefix based services as well as complex deployment scenarios where the network device is coupled to external service complexes located in a different layer-2 domain.

The details of one or more examples are set forth in the accompanying drawings and the description below. Other features, objects, and advantages will be apparent from the description and drawings, and from the claims.

BRIEF DESCRIPTION OF DRAWINGS

FIG. 4 is a conceptual diagram illustrating an example forwarding table consistent with this disclosure.

DETAILED DESCRIPTION

Figure 1:
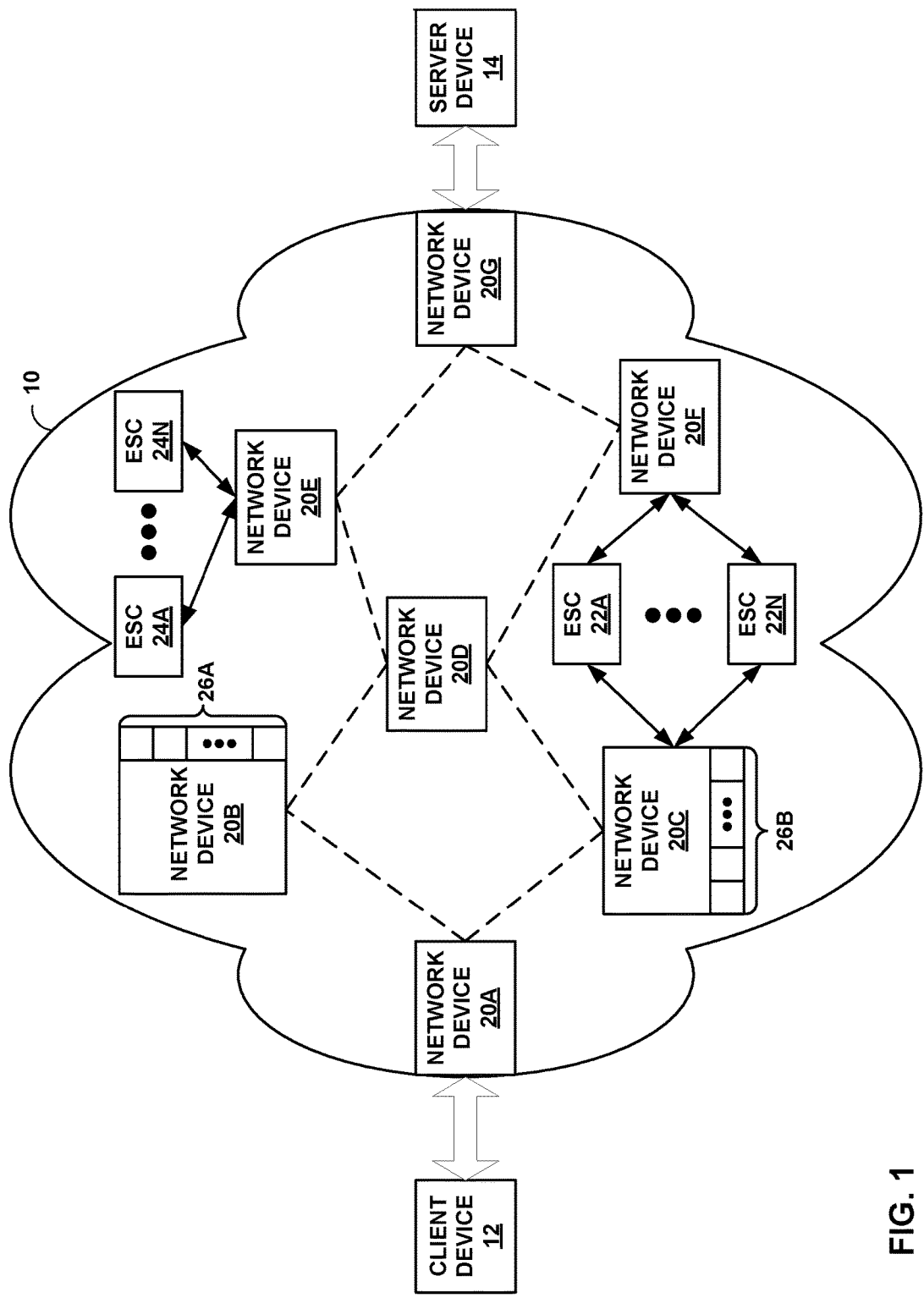
FIG. 1 is a block diagram illustrating an example computer network.

FIG. 1 is a block diagram illustrating an example system in which a network 10 includes network devices 20A-20G (collectively, "network devices 20") and external service complexes ("ESC") 22A-22N, 24A-24N (collectively, "external service complexes 22, 24"). Client device 12 connects to network 10 via network device 20A in order to access resources provided by server device 14. Client device 12 may be an end-user computing device, such as a personal computer, a laptop computer, a mobile telephone, a network telephone, a television set-top box, a video game system, a point-of-sale device, a personal digital assistant, an intermediate network device, a network appliance, a super computer, a mainframe computer, an industrial robot, or another type of device capable of interfacing with and communicating over network 10.

Network 10 includes network devices 20 that facilitate the access of content by client device 12 from server device 14. Each network device 20 may comprise one or more of a router, a switch, a gateway, a hub, a firewall, an intrusion detection/prevention (IDP) device, and/or any other type of networking equipment or device that facilitates the transfer of data between client device 12 and server device 14. Network 10 enables transmission of content between client device 12 and server device 14 using one or more packet-based protocols, such as an Internet Protocol/Transmission Control Protocol (IP/TCP). In this respect network 10 may support the transmission of data via discrete data units, often referred to as "packets." As a result, network 10 may be referred to as a "packet-based" or "packet switched" network. While described in this disclosure as transmitting, conveying, or otherwise supporting packets, network 10 may transmit data according to any other discrete data unit defined by any other protocol, such as a cell defined by the Asynchronous Transfer Mode (ATM) protocol, or a datagram defined by the User Datagram Protocol (UDP).

Each network device 20 may include one or more internal service complexes. Internal service complexes 26A and 26B (collectively, "internal service complexes 26"), as shown in network device 20B and network device 20E, may each include one or more service cards that perform one or more services on a packet. For example, internal service complex 26A may include a service card that is configured to perform one or more services, such as applying deep packet inspection (DPI) services to a packet. Service cards may include custom hardware designed for a particular brand, type, or model of network devices 20. Each network device 20 may also be connected to one or more external service complexes 22, 24. External service complexes 22, 24 may include external blade servers built with one or more service cards within a server enclosure or external servers built with off-the-shelf components, e.g., general purpose hardware, and connected to one or more of network devices 20 via a high-speed bus. External service complexes 22, 24 apply services to packets received from one or more different network devices 20. Each network device 20 may be connected to one or more external service complexes 22, 24 and each of external service complexes 22, 24 is connected to one or more network devices 20.

Network packets include header information, which specifies, for example, the packet's source and destination addresses, source and destination ports, and the IP protocol identifier. Network device 20C may analyze each packet's header and processes each packet accordingly. Based on the packet's source address and source port, for example, network device 20C determines whether the packet requires servicing or other additional processing. If a packet does not require servicing or any additional processing, network device 20C simply forwards the packet to the next network device within network 10 as specified by stored routing information or to the destination device, such as client device 12 or server device 14.

In accordance with the techniques of this disclosure, if network device 20C determines that the packet requires servicing, i.e., services to be applied to the packet, network device 20C forwards the packet to an internal or external service complex based on stored forwarding information. For example, if the stored forwarding information specifies that the packet should be forwarded to external service complex 22A for servicing, the network device applies metadata to the packet. The metadata includes additional information about the packet such as the input interface, the routing instance associated with the packet, the routing instance the packet should be returned to after receiving servicing by external service complex 22A, and service profile information. After applying the metadata, the network device then tunnels the packet to external service complex 22A. In one example, the packet may be tunneled using IP in IP tunneling, as described in RFC 1853 (W. Simpson, *IP in IP Tunneling*, 1995), the entire contents of which is incorporated herein by reference. In another example, the packet may be tunneled using IP in IP encapsulation, as described in RFC 2003 (C. Perkins, *IP Encapsulation within IP*, 1996), the entire contents of which is incorporated herein by reference. For purposes of simplicity and clarity, tunneling as described in this disclosure refers to IP in IP tunneling. However, the techniques may be applied so as to use IP in IP encapsulation to tunnel the packets to external service complex 22A.

In tunneling the packet, the network device applies a tunnel header, such as an IP-IP header to the packet. Tunneling the packet enables external service complex 22A to be located behind a router or in a different layer-2 domain, for example. After the packet receives the required services, external service complex 22A tunnels the packet back to network device 20C. After receiving the packet, network device 20C again forwards the packet in accordance with the stored routing information. The packet may be forwarded to an internal service complex, a different external service complex, the next network device within network 10 or to the destination device.

The discussion of FIG. 1 focuses primarily on the example of network device 20C for clarity and convenience. Each of network devices 20 may operate in substantially the same manner as described with respect to network device 20C. The techniques may be applied so as to allow multiple network devices 20 to share external service complexes, as illustrated by external service complexes 22A-22N and network devices 20C and 20F.

Figure 2:
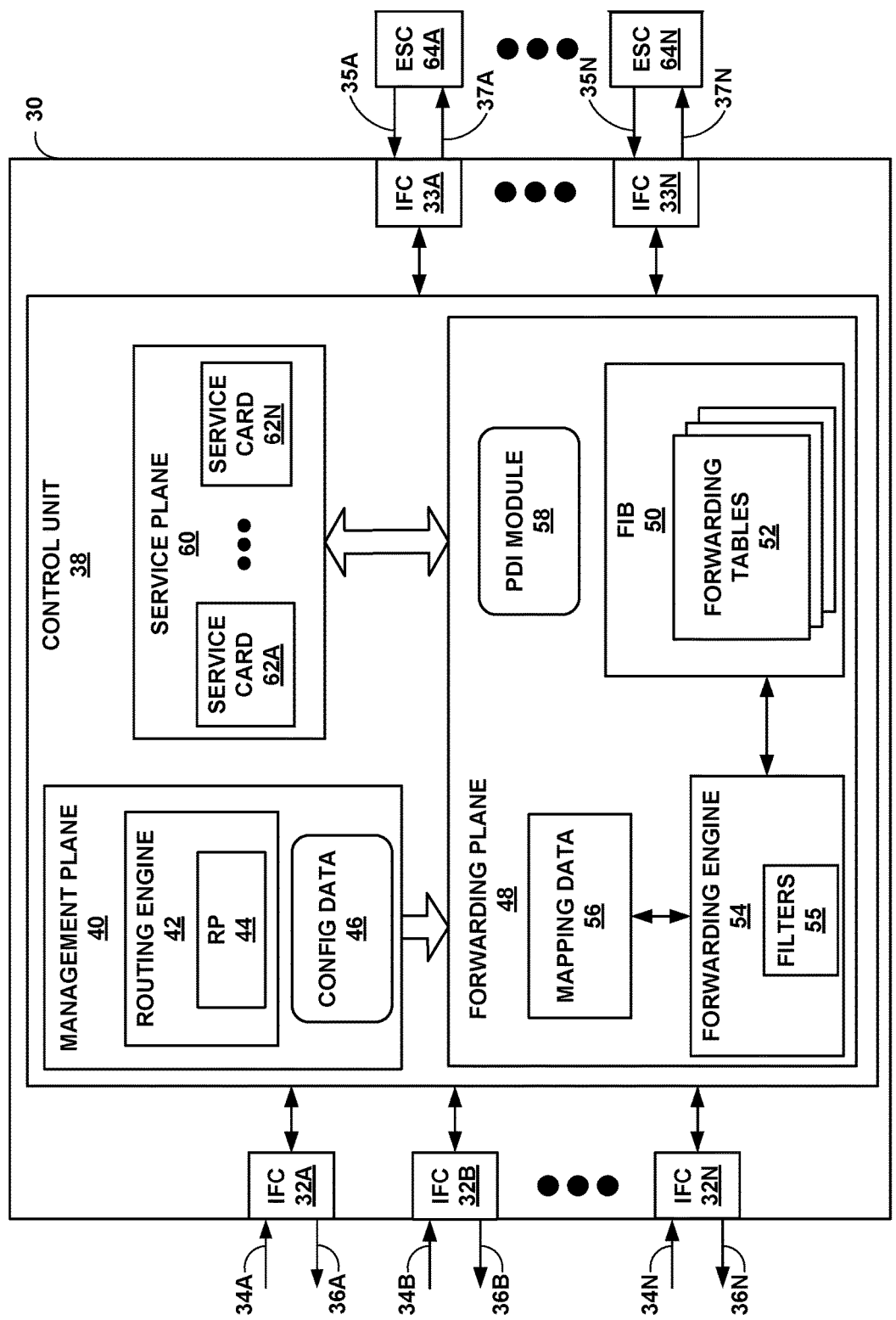
FIG. 2 is a block diagram illustrating an example network device that implements the techniques described in this disclosure.

FIG. 2 is a block diagram illustrating an example network device 30 that implements the techniques described in this disclosure. In this example, network device 30 represents a router that routes packets in accordance with routing information representing a topology of a network. Network device 30 includes interface cards 32A-32N and 33A-33N (collectively, "IFCs 32" and "IFCs 33"). IFCs 32 receive packets via inbound links 34A-34N (collectively, "inbound links 34") and send packets via outbound links 36A-36N (collectively, "outbound links 36"). IFCs 32 are typically coupled to links 34, 36 via a number of interface ports. In one example, IFCs 33 receive packets via inbound links 35A-35N (collectively, "inbound links 35") and send packets via outbound links 37A-37 N (collectively, "outbound links 37") and may be coupled to links 35, 37 via a number of interface ports. In other examples, IFCs 33 may be some other interface capable of transmitting data packets, such as serial advanced technology attachment (SATA), external SATA (eSATA), universal serial bus (USB), FireWire, small computer system interface (SCSI), fiber channel or other high-speed bus via links 35, 37. Network device 30 also includes a control unit 38 that determines routes of received packets and forwards the packets accordingly via IFCs 32, 33. It should be understood that the letter "N" is used to represent an arbitrary number of devices, and moreover, that the number of IFCs 32 is not necessarily equal to the number of IFCs 33, although the cardinality for both IFCs 32 and IFCs 33 is designated using the variable "N."

In general, control unit 38 manages the functionality of network device 30 and may comprise one or more of a processor, a programmable processor, a general purpose processor, an integrated circuit, an Application Specific Integrated Circuit (ASIC), a Field Programmable Gate Array (FPGA), a digital signal processor (DSP), or any combination of hardware, software, and/or firmware capable of implementing the techniques described herein. Control unit 38 may further include computer-readable storage media to store executable program instructions. Examples of such computer-readable storage media include dynamic memory (e.g., Random Access Memory or RAM, dynamic RAM or DRAM, and a cache) and/or static memory (e.g., static RAM or SRAM, a Read Only Memory or ROM, and Flash memory), and permanent storage devices, such as CD-ROMs and magnetic or solid state hard drives. The computer-readable storage medium may, for example, include software instructions that cause a programmable processor to implement the principles of this disclosure.

The components of control unit 38 may be logically segregated into a management plane 40, a forwarding plane 48, and a service plane 60. In this example, management plane 40 includes routing engine 42, which comprises any suitable combination of hardware and/or software, which performs the routing functions of network device 30, such as calculating packet routes and executing routing protocols ("RP") 44 to maintain routing tables. Routing engine 42 maintains routing information in routing information base (not shown) that describes the topology of a network and, in particular, routes through the network. The routing information base may include, for example, route data that describes various routes within the network, and corresponding next-hop data indicating appropriate neighboring devices within the network for each of the routes.

Management plane 40 provides an operating environment for executing routing protocols 44. Routing protocols 44 typically establish peer communication sessions with other routing devices to exchange routing information stored in the routing information base, thereby learning the topology of the network and, more specifically, routes to other network devices within the network. Routing protocols 44 may include exterior routing protocols, such as Border Gateway Protocol (BGP), to exchange routing information with routers of other domains or autonomous systems. Additionally, or alternatively, routing protocols 44 may include interior routing protocols, such as Routing Information Protocol (RIP), Interior Gateway Routing Protocol (IGRP), Open Shortest Path First (OSPF), or Intermediate System to Intermediate System (IS-IS), to learn of "internal" routes, i.e. routes to destinations within the same network as network device 30.

Routing engine 42 further generates forwarding information that associates destination information, such as IP address prefixes, with specific forwarding next-hops and corresponding interface ports of IFCs 32, and provides the forwarding information to forwarding plane 48. The forwarding information is determined based on the information stored in the routing information base as well as configuration information stored in configuration data ("CONFIG DATA") 46. The configuration information of configuration data 46 includes information such what services, if any, need to be applied to packets received via a particular interface port of one of IFCs 32 and IFCs 33 with header information specifying a particular source or destination address, before these packets are forwarded to the appropriate next-hop via one of outbound links 36, 37. The forwarding information is stored in forwarding information base ("FIB") 50. The routing information base, configuration data 46, and FIB 50 may each be stored in the form of one or more tables, databases, linked lists, radix trees, or other suitable data structure.

In the example shown in FIG. 2, FIB 50 includes one or more forwarding tables 52. Forwarding tables 52 may include a default forwarding table corresponding to a default routing instance and a forwarding table for each additional routing instance. Each routing instance may be, for example, a different software instantiation of a routing protocol daemon that maintains its own routing topology information and generates its own forwarding information to be applied in the forwarding plane of network device 30.

Forwarding plane 48 may include any combination of hardware and/or software, which performs forwarding functions of the network device 30, such as packet validation, route lookup, and delivery. In some examples, forwarding plane 48 is distributed in whole or in part to the IFCs 32 in order to perform the requisite forwarding functions on incoming packets in parallel. Forwarding information of FIB 50 associates network destinations with specific next-hops and corresponding interface ports. Forwarding plane 48 also includes forwarding engine 54, which processes packets in accordance with FIB 50.

In general, when network device 30 receives a packet via one of IFCs 32, e.g., IFC 32A, IFC 32A passes the packet to forwarding engine 54, including an indication of a port on which IFC 32A received the packet. Forwarding engine 54 inspects the packet to determine a destination of the packet, e.g., based on header information of the packet that includes an IP address of the destination. In particular, forwarding engine 54 may examine a five-tuple found within a header of each received packet or other information within the packet. The five-tuple may comprise a source IP address of the origination device, a destination IP address, a source port, a destination port, and a protocol identifier. Forwarding engine 54 may extract the five-tuple from the packet header and attempt to look-up the five-type in forwarding tables 52 or in one or more tables of dynamic or static filters 55 stored locally to forwarding engine 54 (such as within a memory (not shown)). The filters indicate particular actions to be performed when a packet is received that matches one of the filters. For example, an action may specify to send the packet to forward the packet to service plane 60 or to one of external service complexes 64. In one example, forwarding engine 54 examines the forwarding information stored in the one of forwarding tables 52 corresponding to the packet's routing instance and performs a lookup based on the packet's header information. In another example, forwarding engine 54 applies one of the dynamic or static filters 55 that corresponds to the packet header information.

The forwarding information corresponding to the packet, or the matching filter 55, may specify that the packet needs to be forwarded to a next-hop via one of IFCs 32, to service plane 60, or to one of external service complexes 64 via one of IFCs 33. Service plane 60 may include at least one of software processes executing within management plane 40, forwarding plane 48 or service cards 62A-62N (collectively, "service cards 62"). Service cards 62 may include hardware blades that are custom designed for a particular make, model, type or manufacturer of network device 30 and/or custom designed to perform one or more services, such as applying quality of service, caching, content delivery network, security, flow blocking, anti-virus (AV) scanning and detection, intrusion detection protection (IDP), network address translation (NAT), firewall services, or other services. Any one of service cards 62 or any combination of service cards 62 may be considered an internal service complex in accordance with the techniques of this disclosure. Service plane 60 may be coupled to forwarding plane 48 via a switch or other high-speed backplane, for example.

In some examples, network device 30 may not include service plane 60, but may be coupled to one or more external service complexes ("ESCs") 64A-64N (collectively, "external service complexes 64"). In other examples, network device 30 may include service plane 60 and be coupled to one or more of external service complexes 64. External service complexes 64 may be coupled to network device 30 by one or more of IFCs 33 and links 34, 37 using conventional IP connectivity or connected by some other interface capable of transmitting data packets, such as serial advanced technology attachment (SATA), external SATA (eSATA), universal serial bus (USB), FireWire, small computer system interface (SCSI), fiber channel or other high-speed bus (not shown). External service complexes 64 may include external hardware blades and/or conventional service complexes such as an intrusion detection/prevention (IDP) service complex, which comprise custom designed and/or general purpose hardware configured to perform one or more services.

When forwarding engine 54 forwards the packet to external service complex 64A, for example, forwarding engine 54 may first forward the packet to pseudo-device interface ("PDI") module 58. That is, forwarding engine 54 passes the packet to pseudo-device interface module 58 before forwarding the packet via one of IFCs 33 to one of external service complexes 64. In some examples, pseudo-device interface module 58 comprises a tunnel packet interface card (a "tunnel PIC") inline with the forwarding plane. In other examples, pseudo-device interface module 58 comprises software executing in the forwarding plane. Pseudo-device interface module 58 may execute an instance of a pseudo-device interface corresponding to each external service complex reachable by network device 30. While described with respect to the pseudo-device interface module 58, each instance of a pseudo-device interface may perform the techniques of this disclosure as described with respect to the pseudo-device interface module 58.

Pseudo-device interface module 58 applies a set of metadata information to each packet and assists with tunneling. In particular, pseudo-device interface module 58 may encapsulate packets to be tunneled with a corresponding label or other header information. The metadata information identifies a set of services to be applied to the packet and may include input interface information, routing instance information such as a routing instance associated with the packet and a routing instance the packet should be returned to after the services are applied by the external service complex, and a service profile. A service profile indicates which services of a set of services offered by the external service complex to which the packet is forwarded need to be applied to the packet. The header information may correspond to a conventional IP-based tunnel header and include information such as a network protocol and destination address. The header information may also include metadata such as information about the server from which the packer originated and information about routing instances, for example.

In general, forwarding engine 54 is configured with mapping data 56 that includes a table or other data structure associated with the one of IFCs 32 that includes indications of inbound packets that require particular services by one or more of external service complexes 64. Mapping data 56 maps particular input interfaces, that is, one of IFCs 32 and 33, to one of forwarding tables 52.

In one example, a daemon (e.g., a software routine) executing at the operating system level of network device 30 uses configuration data 46 to create mapping data 56, such that forwarding engine 54 is able to recognize packets that require services applied by external service complexes 64. According to this example, when a packet is received, forwarding engine 54 inspects the received packet, checks mapping data 56 to determine whether servicing by one of external service complexes 64 is required for the packet, and selects an appropriate one of forwarding tables 52 in which to perform a lookup for the packet. Forwarding engine 54 also performs a lookup based on, for example, the input interface on which the packet was received, the source address of the packet and the destination of the packet, in the table identified by mapping data 56 to determine an output interface. For packets that require servicing by one of external service complexes 64, the result of the lookup performed in the table will cause forwarding engine 54 to pass the packet to pseudo-device interface module 58 before sending the packet to one of external service complexes 64 via one of IFCs 33. In particular, the result of the lookup is a logical interface that is mapped to a physical interface coupled to one of external service complexes 64. The logical interface may first direct data to pseudo-device interface module 58, which applies a set of metadata, encapsulates the data with a tunnel header and then passes the encapsulated data to the physical interface coupled to one of external service complexes 64. A logical interface that is mapped to an external service complex may also be referred to as a pseudo-device interface.

Pseudo-device interface module 58 encapsulates packets to be tunneled with a header corresponding to the tunnel and with additional information, such as metadata, based on the logical interface by which pseudo-device interface module 58 received the packet from forwarding engine 54. Moreover, after encapsulating the packet, pseudo-device interface module 58 passes the packet back to forwarding engine 54 via the logical interface by which pseudo-device interface module 58 received the packet from forwarding engine 54. Forwarding engine 54 then receives the encapsulated packet from pseudo-device interface module 58 via a particular logical interface that is associated with a particular routing instance. In one example, forwarding engine 54 selects one of forwarding tables 50 in which to perform an output interface lookup for the encapsulated packet based on the routing instance associated with the logical interface by which the encapsulated packet was received from pseudo-device interface module 58. In another example, forwarding engine 54 applies a dynamic or static filter 55 to the encapsulated packet. Forwarding engine 54 then forwards the packet to one of external service complexes 64 via the one of IFCs 33 based on the output interface lookup.

In some examples, network device 30 may receive a tunneled packet from one of external service complexes 64. When network device 30 receives a tunneled packet, network device 30 sends the tunneled packets to pseudo-device interface module 58 for decapsulation, and then looks up a destination of the packet in FIB 50 after receiving the decapsulated packet from pseudo-device interface module 58. That is, rather than simply decapsulating tunneled packets received from one of external service complexes 64 and looking up an output interface for the packets in FIB 50 associated with the egress interface, network device 30 is configured to determine whether the packets are to be further tunneled to other external service complexes 64 or whether the packets require further servicing by one or more service cards 62 of service plane 60.

When an administrator couples one of external service complex 64, such as external service complex 64A, to network device 30, network device 30 interacts with external service complex 64A as if external service complex 64A were another internal service card. An administrator may configure network device 30 to forward packets to external service complex 64A to cause the packets to be serviced according to the services provided by external service complex 64A in the same manner as the administrator configures network device 30 to forward packets to internal service cards 62 such that the packets are serviced according to the services provided by one of internal service cards 62. That is, services provided by external service complex 64A are provisioned by the administrator in the same manner as services provided by service cards 62 of service plane 60.

Figure 3:
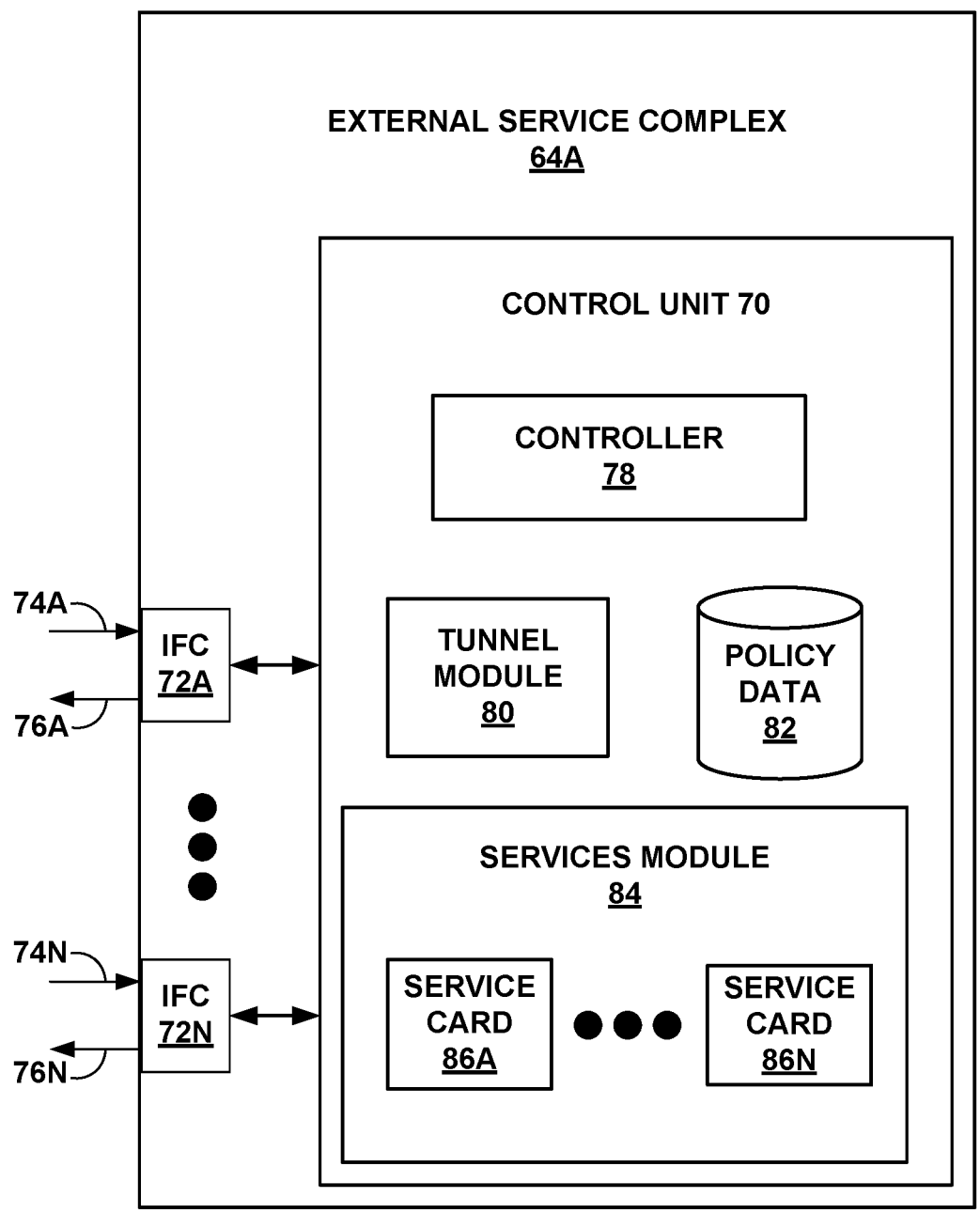
FIG. 3 is a block diagram illustrating an example external service complex consistent with this disclosure.

FIG. 3 is a block diagram illustrating an example of external service complexes 64, e.g., external service complex 64A. In the example shown in FIG. 3, external service complex 64A includes interface cards 72A-72N (collectively, "IFCs 72"). In one example, IFCs 72 receive packets via inbound links 74A-74N (collectively, "inbound links 74") and send packets via outbound links 76A-76N (collectively, "outbound links 76") and may be coupled to links 74, 76 via a number of interface ports. In other examples, IFCs 72 may be some other type of interface capable of transmitting data packets, such as serial advanced technology attachment (SATA), external SATA (eSATA), universal serial bus (USB), FireWire, small computer system interface (SCSI), fiber channel or other high-speed bus via links 74, 76. Each of IFCs 72 may be coupled to one or more network devices 30 via links 74, 76. In some examples, one or more of links 74, 76 may be coupled to an intermediate network device, such as a layer 2 network switch. The intermediate network device may be coupled to one or more additional intermediate network devices, which, in turn may be coupled to network device 30. In this manner, external service complex 64A and network device 30 may be in separate layer 2 domains.

External service complex 64A also includes a control unit 70 that manages the functionality of external service complex 64A and may comprise one or more of a processor, a programmable processor, a general purpose processor, an integrated circuit, an Application Specific Integrated Circuit (ASIC), a Field Programmable Gate Array (FPGA), a digital signal processor (DSP), or any combination of hardware, software, and/or firmware capable of implementing the techniques described herein. Control unit 38 may further include computer-readable storage media to store executable program instructions. Examples of such computer-readable storage media include dynamic memory (e.g., Random Access Memory or RAM, dynamic RAM or DRAM, and a cache) and/or static memory (e.g., static RAM or SRAM, a Read Only Memory or ROM, and Flash memory), and permanent storage devices, such as CD-ROMs, and hard drives. The computer-readable storage medium may, for example, include software instructions that cause a programmable processor to implement the principles of this disclosure.

Control unit 70 includes a controller 78, a tunnel module 80, a policy data 82, and a services module 84. When a packet is received via one of IFCs 72, controller 78 determines how the packet is to be processed by external service complex 64A. For example, controller 78 may examine the received packet, determine that it needs to be decapsulated, and then pass the packet to tunnel module 80. Tunnel module 80, in general, encapsulates and decapsulates packets as required to tunnel the packets between external service complexes 64 and one or more network devices 30. After tunnel module 80 decapsulates the received packet, tunnel module 80 passes the packet back to controller 78 and may also provide to controller 78 any additional information that may have been included in the tunnel header (e.g., information about the originating server). Controller 78 examines the packet and any information that was included in the tunnel header, compares the information learned by examining the packet to the information stored in policy module 82 and processes the packet based on the comparison.

In the example illustrated in FIG. 3, services module 84 includes service cards 86A-86N (collectively, "service cards 86"). Service cards 86 may include hardware blades that are custom designed for a particular make, model, type or manufacturer of external service complex 64A and/or custom designed to perform one or more services, such as applying quality of service, caching, content delivery network, security, flow blocking, anti-virus (AV) scanning and detection, intrusion detection protection (IDP), network address translation (NAT), firewall services, or other services.

Controller 78 processes the received packet in accordance with the information stored within policy data 82. The policy information stored in policy data 82 may be stored in the form of one or more tables, databases, linked lists, radix trees, or any other data structure. Policy data 82 may include information, such as a set of rules, which controls what services are applied to the packet. Policy data 82 may specify, for example, that a packet originating from a particular server is to receive deep packet inspection, security, and antivirus scanning and detection services, whereas a packet originating from a different server is to receive intrusion detection protection and antivirus scanning and detection services. Policy data 82 may specify the particular services that need to be applied to a packet by associating a set of services performed by service cards 86 with a particular service profile.

After all of the appropriate services are applied to the packet, controller 78 passes the packet to tunnel module 80 for encapsulation before sending the packet back to network device 30 via one of IFCs 72. When encapsulating the packet, tunnel module 80 may include additional information, such as routing instance information, to cause the packet to change routing instances within network device 30. The additional information may be passed to tunnel module 80 by controller 78, which determines what, if any, additional information may need to be passed to tunnel module 80 by analyzing the packet and the corresponding policy information of policy data 82.

Each external service complex may be coupled to more than one network device. Referring to the example illustrated in FIG. 1, external service complex 22A, for example, is couple to both network device 20C and network device 20F. When external service complex 22A is coupled to more than one network device, external service complex 22A may utilize virtualization techniques to maintain separate packet flows for packets received from each network device. In this manner, external service complex 22A maintains different policy information stored within policy data 82 for each network device, applies different services to packets received from each network device, and decapsulates and encapsulates each packet with tunnel module 80 in accordance with how each network device is configured.

FIG. 4 is a conceptual diagram illustrating an example forwarding table 100 that may be used during a lookup process when network device 30 receives a packet from a client device (e.g., client device 12) and sends the packet to one of external service complexes 64 via a tunnel. For example, forwarding table 100 may be an example of one of forwarding tables 52 of FIG. 2. Forwarding table 100 of FIG. 4 includes an input interface column 102, a source column 104, a destination column 106, and an output interface column 108. As discussed above, forwarding engine 54 uses information from forwarding tables 52 to determine an output interface by which to forward a packet, based, for example, on the input interface on which the packet was received, the source address of the packet and the destination of the packet. In particular, the output interface is represented in forwarding tables 52 as a logical output interface, which is mapped (by mapping data 56) to physical output interfaces, e.g., one of IFCs 32 or one of IFCs 33. The example of FIG. 4 is directed to an example in which packets received by network device 30 are forwarded to one of external service complexes 64 for servicing.

Forwarding table 100 includes four example entries, represented as rows. The first row of forwarding table 100 includes input interface "gi-1/3/0.0", source "10.1.1.1", and destination "11.2.1.1", which maps to a next-hop lookup result of logical output interface defined as "pdo-1/7/0.0", which may be assigned as a logical interface of pseudo-device interface module 58. In the example of FIG. 4, an input interface defined with a prefix "gi" corresponds to a general input interface, such as one of IFCs 32. A logical output interface defined with a prefix "pdo" may correspond to a logical output interface that is mapped to pseudo-device interface module 58, which pseudo-device interface module 58 will treat as a pseudo-device output interface for an external service complex (e.g., external service complex 64A) in accordance with the techniques of this disclosure. Accordingly, forwarding engine 54 passes a packet destined for logical interface "pdo-1/7/0.0" to pseudo-device interface module 58, which encapsulates the packet and then passes the packet back to forwarding engine 54 for further processing.

The second row of forwarding table 100 includes input interface "pdi-1/7/0.0", source "10.1.1.1", and destination "11.2.1.1", which maps to a next-hop lookup result of logical output interface defined as "so-1/2/0.1", which may be assigned as a logical interface of one of IFCs 33. In the example illustrated in FIG. 4, when pseudo-device interface module 58 passes the packet back to forwarding engine 54, the packet is received via input interface "pdi-1/7/0.0". An input interface defined with a prefix "pdi" corresponds to a pseudo-device input interface. The "so" prefix, in this example, corresponds to a service output interface, such as one of IFCs 33. Mapping data 56 maps the logical interface "so-1/2/0.1" to a particular one of IFCs 33. Accordingly, forwarding engine 54 forwards the packet to external service complex 64A via the mapped one of IFCs 33.

The third row of forwarding table 100 includes input interface "si-2/2/0.1", source "10.1.1.1", and destination "11.2.1.1", which may be mapped to logical output interface "pdo-3/2/0.0". The prefix "si" corresponds to a service input interface and the prefix "pdo" corresponds to a pseudo-device device output interface. In this example, the service input interface indicates that the packet was received from external service complex 64A. The pseudo-device output interface is mapped to pseudo-device interface module 58, which decapsulates the packet and then passes the packet back to forwarding engine 54 for further processing.

The fourth row of forwarding table 100 includes input interface "pdi-3/2/0.0", source "10.1.1.1", and destination "11.2.1.1", which may be mapped to logical output interface "go-1/2/0.0". The prefix "pdi" corresponds to a pseudo-device input interface and the prefix "go" corresponds to a general output interface. Mapping data 56 maps the logical interface "go-1/2/0.0" to a particular one of IFCs 32 and forwarding engine 54 forwards the packet to the next-hop via the mapped one of IFCs 32. The syntax used in the example illustrated in FIG. 4 is merely one example. Network device 30 and forwarding engine 54 may be configured to use any syntax.

Figure 5A:
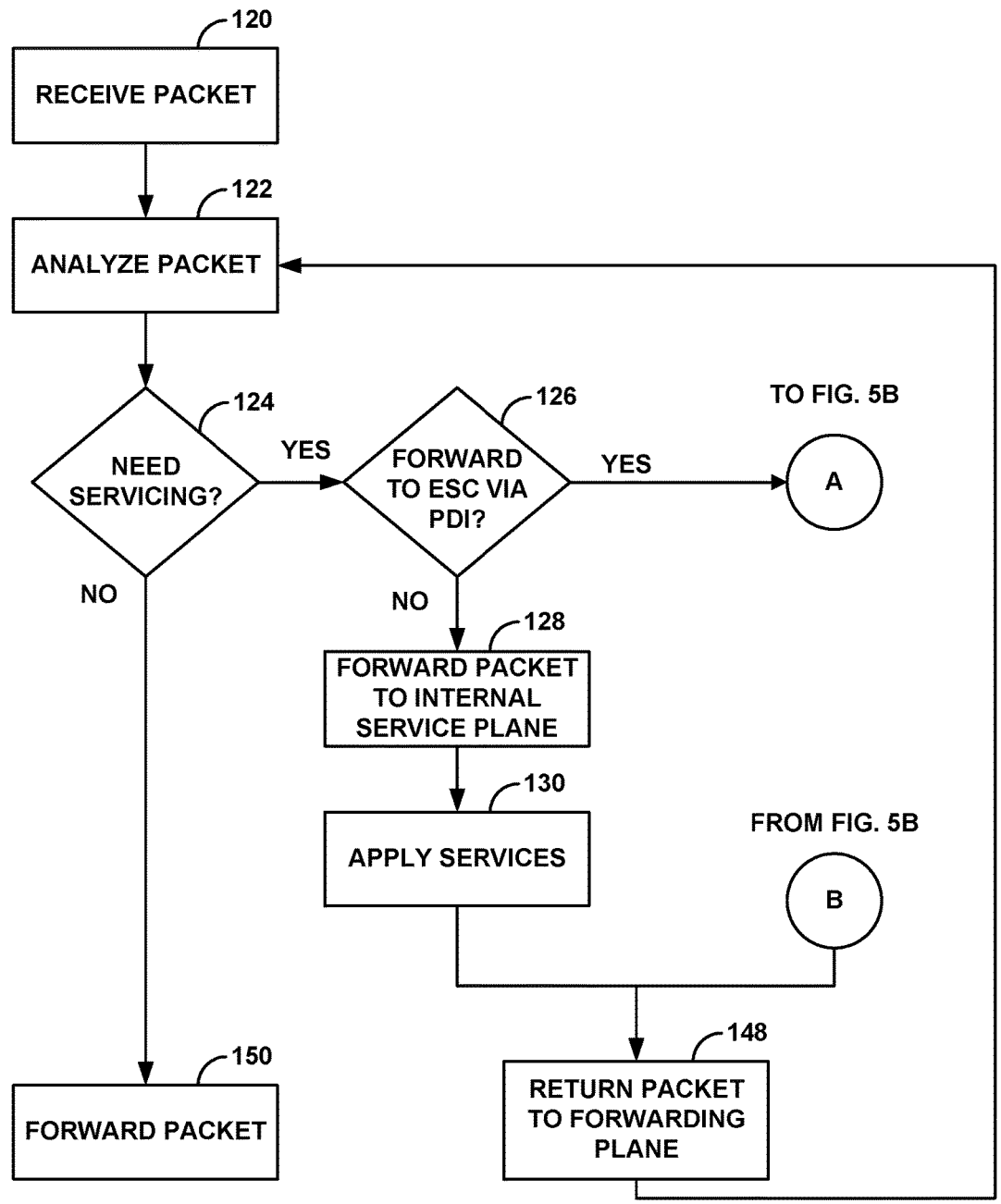
FIGS. 5A and 5B are flowcharts illustrating an example packet flow through a network device that implements the service interface techniques described in this disclosure.
Figure 5B:
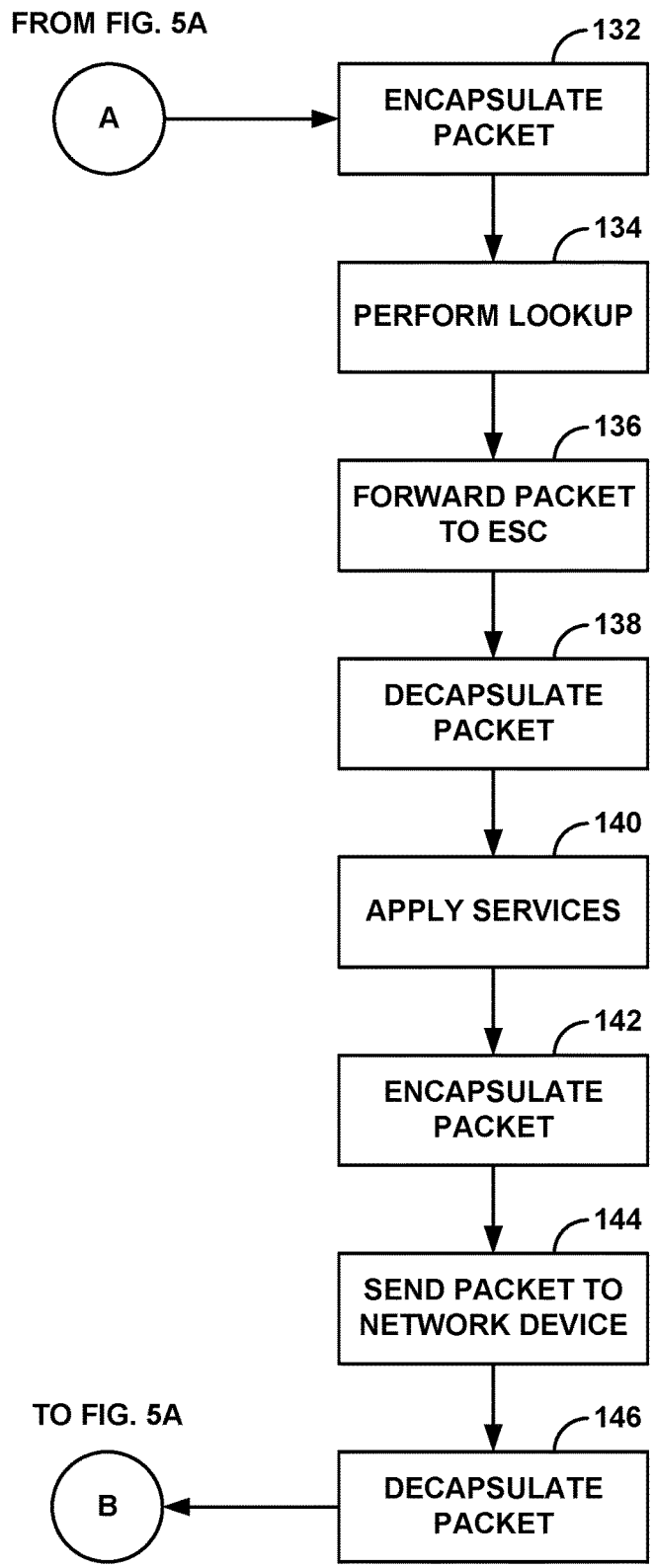

FIGS. 5A and 5B are flowcharts illustrating an example packet flow of a packet being routed by a network device that implements the pseudo-device interface techniques described in this disclosure. The method of FIGS. 5A and 5B is described, for purposes of example, with respect to the network elements of FIG. 2. However, any general network device and external service complex may apply a method similar to that of FIG. 5 to apply services to packets.

In the example of FIG. 5, network device 30 initially receives a packet from a client device, e.g., client device 12 (120). In particular, the packet initially arrives on an inbound interface, such as inbound link 34A of IFC 32A (FIG. 2), which forwards the packet to control unit 38. At this time, the one of IFCs 32 on which the packet arrived also sends to control unit 38 an indication of the physical port on which the packet arrived. Control unit 38 then analyzes the packet (122). In analyzing the packet, forwarding engine 54 may determine if the packet matches a dynamic or static filter 55 stored locally to forwarding engine 54. Alternatively, control unit 38 may select an appropriate one of forwarding tables 52 and forwarding engine 54 may then perform a lookup for the packet in the appropriate one of forwarding tables 52. Based on the filter match or the lookup, forwarding engine 54 determines whether the packet requires services, or applies a corresponding action that controls whether the packet requires services. If the packet does not need servicing ("NO" branch of 124), forwarding engine 54 forwards the packet via the one of IFCs 32 and outbound links 36 as mapped by mapping data 56 based on the logical output interface (150).

If the packet needs servicing ("YES" branch of 124), forwarding engine 54 passes the packet to either one of service cards 62 of service plane 60 via a high-speed bus or forwarding engine 54 passes the packet to pseudo-device interface module 58 for encapsulation based on the looked up logical interface. If the logical interface corresponds to a pseudo-device interface, e.g., the logical interface has a "pdo" prefix, the packet needs to be forwarded to an external service complex via a pseudo-device interface for servicing ("YES" branch of 126). If the logical interface corresponds to one of service cards 62 in service plane 60, the packet does not require servicing via a pseudo-device interface ("NO" branch of 126). When the packet requires services via an internal service card ("NO" branch of 126), forwarding engine 54 passes the packet to service plane 60 (128) for servicing by one or more of service cards 62 (130). Service cards 62 apply the required services (130) and service plane 60 returns the packet to the forwarding plane 48 (148) for further analysis (122). If the packet does not require any additional services to be applied by service plane 60 or by one of external service complexes 64, forwarding engine 54 forwards the packet to the next-hop via the one of IFCs 32 and outbound links 36 as mapped by mapping data 56 based on the logical output interface (150).

Referring to FIG. 5B, when the packet needs to be forwarded to an external service complex via a pseudo-device interface for servicing ("YES" branch of 126), forwarding engine 54 passes the packet to pseudo-device interface module 58 for the application of metadata and encapsulation (132). Pseudo-device interface module 58 may apply metadata such as an input interface, routing instance information such as the routing instance associated with the packet or the routing instance the packet should be returned to after receiving servicing, or a service profile. Pseudo-device interface module 58 also encapsulates the packet with, for example, an IP header and additional information such as information about the server from which the packet originated. After encapsulation, pseudo-device interface module 58 passes the packet back to forwarding engine 54 which performs another lookup on in the appropriate one of forwarding tables 52 (134) and forwards the packet to the appropriate one of external service complexes 64, i.e., external service complex 64A, for servicing (136).

Using external service complex 64A of FIG. 3 as an example, external service complex 64A receives the packet from network device 30 via one of IFCs 72 and tunnel module 80 decapsulates the packet (138) and passes the decapsulated packet and any additional information contained in the encapsulating information to controller 78. Controller 78 manages the packet and causes the required services to be applied to the packet by service cards 86 of services module 84 based on policy data 82 (140). After the required services are applied, controller 78 passes the packet to tunnel module 80 for encapsulation (142). Tunnel module 80 may encapsulate the packet with additional information that may cause the packet to change routing instances within network device 30, for example. Controller 78 then sends the packet back to network device 30 via one of IFCs 72 (144). Network device 30 receives the packet via one of IFCs 33, forwarding engine 54 performs a lookup in the appropriate one of the forwarding tables 52 and passes the packet to pseudo-device interface module 58 for decapsulation (146). Pseudo-device interface module 58 passes the packet back, along with any addition information included in the headers, to forwarding plane 48 for further processing (148).

Forwarding engine 54 analyzes the packet (122) and applies any further services that may be required by service plane 60 or other external service complexes 64 in substantially the same manner. Once the packet does not require any additional services to be applied, forwarding engine 54 forwards the packet to the next-hop via the one of IFCs 32 and outbound links 36 as mapped by mapping data 56 based on the logical output interface (150).

In this manner, even though the service plane 60 may include both internal service cards 62 and external service complexes 64, the forwarding plane 48 is able to interact with the services plane 60 and the external service complexes 64 in a simplified manner. The combination of the pseudo-device logical interfaces of forwarding tables 52 and pseudo-device interface module 58 provides an abstract view of the external service complexes 64 to the forwarding plane 48, so that each external service complexes 64 may be viewed by the forwarding plane 48 as though it were, for example, an internal service card.

The techniques described in this disclosure may be implemented, at least in part, in hardware, software, firmware or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit comprising hardware may also perform one or more of the techniques of this disclosure.

Such hardware, software, and firmware may be implemented within the same device or within separate devices to support the various operations and functions described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware or software components. Rather, functionality associated with one or more modules or units may be performed by separate hardware or software components, or integrated within common or separate hardware or software components.

The techniques described in this disclosure may also be embodied or encoded in a computer-readable medium, such as a computer-readable storage medium, containing instructions. Instructions embedded or encoded in a computer-readable medium may cause a programmable processor, or other processor, to perform the method, e.g., when the instructions are executed. Computer readable storage media may include random access memory (RAM), read only memory (ROM), programmable read only memory (PROM), erasable programmable read only memory (EPROM), electronically erasable programmable read only memory (EEPROM), flash memory, a hard disk, a CD-ROM, a floppy disk, a cassette, magnetic media, optical media, or other computer-readable storage media. It should be understood that the term "computer-readable storage media" refers to physical storage media, and not signals, carrier waves, or other transient media.

Various examples have been described. These and other examples are within the scope of the following claims.

What is claimed is:

1. A method for providing one or more services to a packet traversing a service provider network, the method comprising:
   receiving, with a network switch of the service provider network, a packet associated with a client device of the service provider network;
   determining, with the network switch, to apply one or more services to the packet associated with client device;
   accessing, with a forwarding engine of the network switch, a forwarding structure to select a first logical interface to which to forward the packet, wherein the forwarding structure comprises a plurality of entries that each refer to one of a plurality of logical interfaces, wherein the first logical interface comprises one of the plurality of logical interfaces, wherein each of the plurality of logical interfaces correspond to a respective internal service component of the network switch, and wherein the first logical interface corresponds to a particular internal service component of the network switch;
   forwarding, with the forwarding engine, the packet to the particular internal service component;
   applying, with the particular internal service component, a tunnel header and metadata to the packet to form a tunnel packet, wherein the metadata specifies at least one network service to be applied when forwarding the packet within the service provider network; and
   forwarding, by the network switch and through a network tunnel, the tunnel packet from the network switch to a service complex external to the network switch, the external service complex comprising a plurality of network devices for application of the one or more network services to the packet in accordance with the metadata.

2. The method of claim 1, wherein the metadata specifies a forwarding instance within the network switch to which the packet is to be forwarded by the external service complex after application of the one or more network services.

3. The method of claim 1, further comprising:
   receiving, with the network switch, an inbound tunnel packet from the external service complex, wherein the inbound tunnel packet contains the packet associated with the client device as processed by the external service complex after application of the one or more network services;
   decapsulating the packet from the inbound tunnel packet; and
   performing, with the network switch, path selection and forwarding the packet within the service provider network.

4. The method of claim 1,
wherein forwarding, by the network switch and through a network tunnel, the tunnel packet from the network switch to the external service complex comprises forwarding, with the particular internal service component and through the network tunnel, the tunnel packet from the network switch to the external service complex.

5. The method of claim 1, wherein the metadata specifies a service profile associated with the client device.

6. The method of claim 1, wherein the one or more network services comprises one or more of network address translation (NAT), applying quality of service, caching, content delivery services, security services, flow blocking, anti-virus (AV) scanning and detection, intrusion detection protection (IDP), network address translation (NAT) and firewall services.

7. The method of claim 1, further comprising:
outputting, with the network switch, an administrator interface that includes information about a set of services able to be performed on packets received by the network switch, wherein the set of services includes one or more services capable of being performed on the packets by a service complex internal to the network switch and one or more services capable of being performed on the packets by the external service complex;
receiving, with the network switch via the administrator interface, a set of instructions for configuring the set of services able to be performed on packets received by the network switch, wherein the instructions includes configuration information for at least one of the one or more services capable of being performed on the packets by the external service complex; and
configuring, with the network switch and based on the set of instructions, the at least one of the one or more services capable of being performed on the packets by the external service complex as if the at least one of the one or more services capable of being performed on the packets by the external service complex was a service capable of being performed on the packets by the service complex internal to the network switch.

8. A method comprising:
receiving, with a network switch of the service provider network, a packet associated with a client device of the service provider network;
determining, with the network switch, to apply one or more services to the packet associated with client device;
applying, with the network switch, a tunnel header and metadata to the packet to form a first tunnel packet containing the packet and the metadata, wherein the metadata specifies at least one network service to be applied when forwarding the tunneled packet within the service provider network;
forwarding, by the network switch and through a network tunnel, the first tunnel packet from the network switch to a service complex external to the network switch, the external service complex comprising a plurality of network devices for application of the one or more network services to the packet in accordance with the metadata;
receiving, with the network switch, an inbound tunnel packet from the external service complex, wherein the inbound tunnel packet contains the packet associated with the client device as processed by the external service complex after application of the one or more network services;

decapsulating the packet from the inbound tunnel packet;
applying, with the network switch, a second tunnel header and second metadata to the packet to form a second tunnel packet containing the packet and the second metadata, wherein the second metadata specifies at least a second network service to be applied when forwarding the within the service provider network; and
forwarding, by the network switch and through a second network tunnel, the second tunnel packet from the network switch to a second external service complex comprising a plurality of network devices for application of the second network service to the packet in accordance with the second metadata.

9. A method comprising:
receiving, with a network switch of the service provider network, a packet associated with a client device of a service provider network;
determining, with the network switch, to apply one or more services to the packet associated with client device;
accessing, with a forwarding engine of the network switch, a forwarding structure to select, based on the header information, a first logical interface to which to forward the packet, wherein the forwarding structure comprises a plurality of entries that each refer to one of a plurality of logical interfaces, wherein the first logical interface comprises one of the plurality of logical interfaces, wherein each of the plurality of logical interfaces correspond to a respective internal service component of the network switch, and wherein the first logical interface corresponds to a pseudo-device interface module of the network switch;
forwarding, with the forwarding engine, the packet to the pseudo-device interface module;
applying, with the pseudo-device interface module, a tunnel header and metadata to the packet to form a tunnel packet, wherein the metadata specifies at least one network service to be applied when forwarding the packet within the service provider network; and
forwarding, by the network switch and through a network tunnel, the tunnel packet from the network switch to a service complex external to the network switch, the external service complex comprising a plurality of network devices for application of the one or more network services to the packet in accordance with the metadata.

10. A network switch comprising:
a plurality of internal service components;
a plurality of physical network interfaces for sending and receiving network packets within a service provider network; and
a control unit comprising a processor, a forwarding engine and computer-readable storage media,
wherein the computer-readable storage media stores a forwarding structure comprising a plurality of entries that each refer to one of a plurality of logical interfaces,
wherein the control unit receives, via one of the plurality of physical network interfaces, a packet associated with a client device of the service provider network, the packet having header information,
wherein the forwarding engine accesses the forwarding structure to select a first logical interface to which to forward the packet, wherein the first logical interface comprises one of the plurality of logical interfaces, wherein each of the plurality of logical interfaces correspond to a respective internal service component of the plurality of internal service components, and wherein the first logical interface corresponds to a particular internal service component of the plurality of internal service components, and forwards the packet to the particular internal service component, wherein the particular internal service component applies the tunnel header and the metadata to the packet to form a tunnel packet, wherein the metadata specifies at least one network service to be applied when forwarding the packet within the service provider network, and forwards, through a network tunnel, the tunnel packet from the network switch to a service complex external to the network switch, the external service complex comprising a plurality of network devices for application of the one or more network services to the packet in accordance with the metadata.

11. The network switch of claim 10, wherein the metadata specifies a forwarding instance within the network switch to which the packet is to be forwarded by the external service complex after application of the one or more network services.

12. The network switch of claim 10, wherein the control unit receives, via another one of the plurality of physical network interfaces, an inbound tunnel packet from the external service complex, wherein the inbound tunnel packet contains the packet associated with the client device as processed by the external service complex after application of the one or more network services, decapsulates the packet from the inbound tunnel packet, and performs path selection and forwarding the packet within the service provider network.

13. The network switch of claim 10, wherein the control unit forwards, through a network tunnel, the tunnel packet from the network switch to the external service by at least forwarding, via the particular internal service component and through the network tunnel, the tunnel packet from the network switch to the external service complex.

14. The network switch of claim 10, wherein the control unit:

outputs an administrator interface that includes information about a set of services able to be performed on packets received by the network switch, wherein the set of services includes one or more services capable of being performed on the packets by a service complex internal to the network switch and one or more services capable of being performed on the packets by the external service complex;

receives, via the administrator interface, a set of instructions for configuring the set of services able to be performed on packets received by the network switch, wherein the instructions include configuration information for at least one of the one or more services capable of being performed on the packets by the external service complex; and configures, w based on the set of instructions, the at least one of the one or more services capable of being performed on the packets by the external service complex as if the at least one of the one or more services capable of being performed on the packets by the external service complex was a service capable of being performed on the packets by the service complex internal to the network switch.

15. A network switch comprising:

a plurality of physical network interfaces for sending and receiving network packets within a service provider network; and a control unit comprising a processor, wherein the control unit:

receives, via one of the plurality of physical network interfaces, a packet associated with a client device of the service provider network, the packet having header information;

determines to apply one or more services to the packet associated with client device, applies a tunnel header and metadata to the packet to form a first tunnel packet containing the packet and the metadata, wherein the metadata specifies at least one network service to be applied when forwarding the packet within the service provider network;

forwards, through a network tunnel, the first tunnel packet from the network switch to a service complex external to the network switch, the external service complex comprising a plurality of network devices for application of the one or more network services to the packet in accordance with the metadata;

receives, via another one of the plurality of physical network interfaces, an inbound tunnel packet from the external service complex, wherein the inbound tunnel packet contains the packet associated with the client device as processed by the external service complex after application of the one or more network services;

decapsulates the packet from the inbound tunnel packet;

applies a second tunnel header and second metadata to the packet to form a second tunnel packet containing the packet and the second metadata, wherein the second metadata specifies at least a second network service to be applied when forwarding the within the service provider network; and forwards, through a second network tunnel, the second tunnel packet from the network switch to a second external service complex comprising a plurality of network devices for application of the second network service to the packet in accordance with the second metadata.

16. A network switch comprising:

a plurality of physical network interfaces for sending and receiving network packets within a service provider network; and a control unit comprising a processor, a forwarding engine, computer-readable storage media, and a pseudo-device interface module configured to execute one or more pseudo-device interface instances, wherein the computer-readable storage media stores a forwarding structure comprising a plurality of entries that each refer to one of a plurality of logical interfaces, wherein the control unit receives, via one of the plurality of physical network interfaces, a packet associated with a client device of the service provider network, the packet having header information, wherein the forwarding engine accesses the forwarding structure to select a first logical interface to which to forward the packet, wherein the first logical interface comprises one of the plurality of logical interfaces, and wherein the first logical interface corresponds to one of the pseudo-device interface instances, wherein the one of the pseudo-device interface instances applies a tunnel header and the metadata to the packet to form a tunnel packet, wherein the metadata specifies at least one network service to be applied when forwarding the packet within the service provider network, and wherein the forwarding engine forwards, through a network tunnel, the tunnel packet from the network switch to a service complex external to the network switch, the external service complex comprising a plurality of network devices for application of the one or more network services to the packet in accordance with the metadata.

* * * * *